Figure 1:
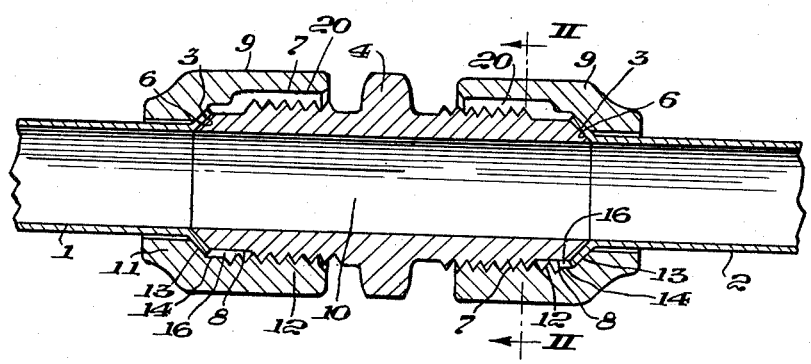

Feb. 20, 1951     K. M. NEWCUM     2,542,877
VENTED REFRIGERANT TUBE COUPLING

Filed Feb. 2, 1950

INVENTOR.
Kenneth M. Newcum
BY
Brown, Critchlow, Flick & Peckham
his ATTORNEYS.

Patented Feb. 20, 1951

2,542,877

UNITED STATES PATENT OFFICE 2,542,877

VENTED REFRIGERANT TUBE COUPLING

Kenneth M. Newcum, Harmony, Pa., assignor to Remco, Incorporated, Zelienople, Pa., a corporation of Pennsylvania Application February 2, 1950, Serial No. 142,047

2 Claims. (Cl. 285—86)

This invention relates to a pipe coupling and, in particular, to a coupling for connecting a refrigerant-carrying tube into a refrigerating system.

In refrigerating systems, it is important to exclude as much moisture as possible, because, for one reason, such moisture may "freeze out" at the refrigerant control and either destroy the efficiency of the control or completely block further refrigerant flow. Also, moisture within the system may react to form acids which will cause harmful corrosion. One of the places where moisture can enter is at the many connections of the refrigerant-carrying pipes, either to themselves or to other elements of the system such as the pump, condenser, refrigerant control and evaporator. The difficulty lies in the fact that the coupling commonly used for making these joints is a threaded connection, and moisture can find its way across these threads. Of course, a seal is provided for the coupling, but it has been found that moisture which seeps in across the threads freezes and expands during the freezing cycle of the system and creates such pressure that the coupling members are distorted and the seal broken. The continual freezing and thawing occurring during the refrigerating cycles eventually so loosens, splits or cracks the coupling that moisture can enter quite freely, and, when this occurs, it is necessary to stop operation and repair the coupling. Also, when the coupling is so loosened, split, or cracked, the refrigerant within the system may leak out to atmosphere during the non-freezing cycle, and this leakage may reach such proportions as to render the system inoperative.

It is therefore an object of this invention to provide a sealed coupling for connecting a refrigerant tube into the refrigerating system, the coupling being so formed that expansion of moisture within it creates very little pressure upon the members forming the coupling, so that a tight seal is maintained. Another object is to form such a coupling in an unusually simple and economical manner.

Broadly, the coupling provided by the invention includes an exteriorly threaded pipe fitting which has a beveled outer end adapted to press against the ends of the tube to be connected, this tube end being outwardly flared to receive the beveled end of the fitting. Also, an interiorly threaded nut is fitted over the tube and is provided with a beveled seat which presses the outwardly flared end of the tube against the beveled end of the fitting to form the seal. The threads of the fitting and the nut engage and, when the nut is tightened, sufficient pressure is exerted upon the tube's flared end to prevent entrance of moisture into the system.

The coupling described thus far is quite a well-known commercial article, but it is subject to the difficulty that moisture entering between the threads of the fitting and the nut expands during the freezing cycle and presses the fitting away from the nut, or the nut away from the fitting, so as to break the seal formed by the pressure of these two members. In the present invention, this difficulty is avoided by forming a groove either in the threads of the nut or the fitting, this groove extending across the threads of the member in which it is formed from the interior of the coupling to atmosphere. Consequently, when the freezing cycle of the refrigerating system occurs, any moisture which has entered can pass out through the groove to atmosphere. As a result, the freezing and expanding moisture does not create pressure sufficient to distort either the fitting or the nut, so that the seal is maintained.

Figure 2:
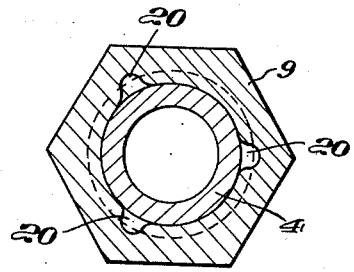
Figure 3:
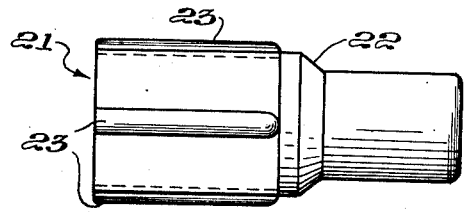

The preferred embodiment of the invention is illustrated in the accompanying drawing, of which Fig. 1 is a vertical section through the coupling; Fig. 2 is a section along the lines II—II of Fig. 1; and Fig. 3 a forging die punch used in the manufacture of the nut of the coupling.

Referring to Fig. 1 of the drawing, it is noted that the particular joint formed is a coupling of two refrigerant tubes 1 and 2 to each other, and that each of the tubes is provided with an outwardly flared end portion 3. This particular application of the invention, however, is used purely for descriptive purposes, and it will be understood that the improvements provided may be used in all connections of the tubing, such as the connection of tubing to the refrigerant control. In fact, splitting or cracking of coupling is most prevalent at this refrigerant control connection.

In the tube to tube connection illustrated, a tube fitting or connection member, generally designated by the numeral 4, is provided at both ends with a beveled portion 6 which abuts the interior surfaces of outwardly flared ends 3 of the refrigerant tubes. Near each end of the fitting, but spaced from its beveled end portion 6, the fitting is provided with exterior threads 7, the spacing of the threads from beveled ends 6 providing an unthreaded portion 8 at each end. Also, the fitting is formed with a central bore 10 through which the refrigerant flows in passing from one tube into the other, or from one other part of the refrigerating system to the tube, as the case may be.

The coupling also includes nuts 9, each of which has a rear portion 11 fitted over its tube and also is provided with interior threads 12 that engage threads 7 of the fitting. Interiorly of the nuts, near their inner ends, are formed beveled seats 13, and, when the nuts are tightened onto the fitting, beveled seats 13 press against the exterior surfaces of outwardly flared end portions 3 of the tube, so that these outward flares are clamped between these seats and beveled ends 6 of the fitting. Threads 12 of the nuts extend rearwardly across the major portion of the nuts' interior wall, but it will be noted that each of the nuts is provided with an unthreaded portion 14 which, when the nut tightly engages the fitting, lies adjacent to unthreaded portions 8 of the fitting. However, as may be noted in Fig. 1, the unthreaded portions are spaced from each other, this spacing forming a circular passage 16 between the nut and the fitting.

Considering only such structure as has been described above, it should be apparent that moisture seeping across the threaded engagement of the fitting and the nut could collect in circular passages 16. So long as this moisture is in a liquid state, the seal of the coupling would exclude it from the system. However, during the freezing cycle of the refrigerant system, the liquid lying in circular passages 16, in expanding would create pressure sufficient to distort either the fitting or the nut, and it will be appreciated that the seal created by these members would be broken and the ice, which forms during the freezing cycle, could expand past the seals and into the system, or refrigerant within the system could leak out to atmosphere.

An important feature of this invention resides in avoiding such seal-breaking pressure and, as will be seen in Figs. 1 and 2, such is very simply accomplished by providing nuts 9 with a plurality of grooves 20 that extend axially across the threads of the nuts and, preferably, extend from approximately the central portion of circular passages 16 outwardly to atmosphere. With such an arrangement, moisture which has found its way into circular passages 16, as well as moisture lying within grooves 20, in expanding will follow the path of least resistance and will pass out through the grooves to atmosphere. Of course, the same results can be obtained by forming the grooves across the threads of the fitting, but it is preferred to form the grooves across the threads of the nuts.

Aside from the very effective operation of these grooves in permitting moisture to expand to atmosphere and in thus maintaining the seal, the coupling has the advantage of being very quickly and economically manufactured. Fitting or connection 4 is formed in the same manner as prior fittings of this type, and little difficulty has been experienced with the manufacture of these members. However, forming of moisture vents presents more difficulty, since many types of vents would require a special machining operation which might price the couplings out of this highly competitive field. In the present invention, the vents can be formed without any added machining step, since the grooves can be formed by a special forging die punch 21, illustrated in Fig. 3. This punch, as will be noted, is formed with an interior beveled seat 22 and also with ribs 23, so that at one stroke interior beveled seats 13 of the nuts, as well as grooves 20 are formed. No further manufacturing step then is required except the forming of interior threads 12 of the nuts. Preferably, grooves 20 are approximately one sixty-fourth to one thirty-second of an inch deeper than the root diameter of the threads. Another feature which facilitates manufacturing is the fact that the grooves are tapered from their inner ends outwardly, or in other words, the depth of the grooves progressively increases from their inner ends outwardly. Such being the case, the forging operation is greatly facilitated, since the forging die punch can be withdrawn with great ease.

From the above description it should be appreciated that the invention provides a coupling which not only excludes moisture effectively, but also one that is very economically manufactured.

According to the provisions of the patent statutes, I have explained the principle, preferred embodiment and mode of operation of my invention, and have illustrated and described what now is considered to represent its best embodiment. However, I desire to have it understood that, within the scope of the appended claims, the invention may be practiced otherwise than as specifically illustrated and described.

I claim:

1. A coupling for connecting an outwardly-flared end of a refrigerant tube into a refrigerating system, said coupling comprising the combination of a fitting provided with an axial bore and having a threaded portion, a beveled end portion fitted into said outwardly flared end of said refrigerant tube and an unthreaded portion lying between said beveled end and said threads, with a nut adapted to fit over said tube, said nut being provided interiorly with threads engaged with the threads of said fitting, and also having formed near its inner end a beveled seat abutting the exterior surface of said outwardly flared end of said tube whereby a seal is formed between the beveled seat and said beveled end portion of the fitting, the portion of said nut adjacent said unthreaded portion of said fitting also being unthreaded and being of greater diameter than the unthreaded portion of the fitting whereby a circular passage is formed between these adjacent portions, one of said engaged threaded members being provided with a groove extending longitudinally across the threads of that member from said circular passage to atmosphere.

2. A coupling for connecting an outwardly-flared end of a refrigerant tube into a refrigerating system, said coupling comprising the combination of a fitting provided with an axial bore and having a threaded portion, a beveled end portion fitted into said outwardly flared end of said refrigerant tube and an unthreaded portion lying between said beveled end and said thread, with a nut adapted to fit over said tube said nut being provided interiorly with threads engaged with the threads of said fitting, and also having formed near its inner end a beveled seat abutting the exterior surface of said outwardly flared end of said tube whereby a seal is formed between the beveled seat and said beveled end portion of the fitting, the portion of said nut adjacent said unthreaded portion of said fitting also being unthreaded and being of greater diameter than said unthreaded portion of the fitting whereby a circular passage is formed between these adjacent portions, said nut being provided with a plurality of grooves extending longitudinally across its threads from near the central portion of said circular passage to atmosphere, said grooves being progressively deepened from their inner to their outer ends.

KENNETH M. NEWCUM.

REFERENCES CITED

The following references are of record in the file of this patent:

UNITED STATES PATENTS

| Number | Name | Date |
|---|---|---|
| 1,973,170 | Jacobi | Sept. 11, 1934 |
| 2,323,099 | Patten | June 29, 1943 |